United States Patent [19]

Breitwisch

[11] Patent Number: 4,569,061
[45] Date of Patent: Feb. 4, 1986

[54] PHASE DISTORTION ADAPTIVE DETECTOR OF MINIMUM SHIFT KEYING DATA

[75] Inventor: Ronald L. Breitwisch, Cedar Rapids, Iowa

[73] Assignee: Rockwell International Corporation, El Segundo, Calif.

[21] Appl. No.: 588,184

[22] Filed: Mar. 12, 1984

[51] Int. Cl.[4] .............................................. H03D 3/00
[52] U.S. Cl. ........................................ 375/90; 375/96; 329/104
[58] Field of Search ....................... 375/47, 90, 91, 96; 329/104; 340/825.58

[56] References Cited

U.S. PATENT DOCUMENTS

| | | | |
|---|---|---|---|
| 3,992,617 | 11/1976 | Epstein | 375/90 |
| 4,020,283 | 4/1977 | Epstein | 375/90 |
| 4,028,490 | 6/1977 | Epstein | 375/90 |
| 4,414,675 | 11/1983 | Comroe | 375/90 |

OTHER PUBLICATIONS

Suzuki et al., "Single-Chip CMOS MSK Coherent Demodulator" Electronic Letters, Jun. 24, 1982, vol. 18, No. 13.

*Primary Examiner*—Robert L. Griffin
*Assistant Examiner*—Stephen Chin
*Attorney, Agent, or Firm*—Richard W. Anderson; Robert C. Mayes; H. Fredrick Hamann

[57] ABSTRACT

The minimum shift keying (MSK) data detection system described compensates for the differential phase shift distortion produced by passing the MSK signal through a voice grade audio channel such as a VHF AM transmitter and receiver. This distortion varies and is dependent on the particular transmitter and receiver being used. The detection system examines the preamble of the MSK signal and measures the differential phase shift of the two modulating tone. This measured value is then used to establish pre-distorted waveforms to which the incoming data is compared for detection.

4 Claims, 5 Drawing Figures

PHASE DISTORTION ADAPTIVE DETECTOR OF MINIMUM SHIFT KEYING DATA

This invention relates generally to demodulators and more particularly to an improved demodulator for recovering intelligence from a minimum shift keying (MSK) data detection system.

The improved detection system to be herein described is useful for more accurately determining the intelligence content in a minimum shift keying data signal system of the type which employs discrete audio tone modulation signal intervals wherein, for example, one cycle of 2400 Hz indicates that the instant data bit is the same as the previous data bit, while one-half cycle of 1200 Hz indicates that the instant data bit is the opposite of the previous data bit. The cycles of 2400 Hz and one-half cycles of 1200 Hz are concatenated in such a way as to cause minimum waveform discontinuity. In the ACARS system currently in use, the transition between 2400 Hz and 1200 Hz "symbols" occurs at the zero crossings of the waveform.

Minimum shif keying data transmission systems are known in the art and are exemplified, for example, by Teledyne Controls Model 70-151, part number 222-5671. The known demodulation technique is to generate reference sysmbols of both 1200 Hz and 2400 Hz at the receiver and then correlate the incoming data to the receiver demodulator with these idealized reference signals, that is, idealized in the sense that they are precisely in phase with, and correlated to, the received symbols. Stated otherwise, previous art has attempted to detect minimum shift keying data by comparing the received data to the ideal "1" and "0" data defining waveforms of the form generated by the data transmitter.

However, transmission of minimum shift keying data through a voice grade channel such as a VHF AM transmitter and receiver introduces phase distortion in the waveforms due to unequal time delays imposed on the two MSK data tones, resulting in reduced noise immunity and even false detection.

It is an object therefore of the present invention to compensate for phase distortion which may be imposed on received waveforms due to the unequal time delays imposed on the two MSK data tones.

The present invention is featured in the provision of a means for measuring the differential time delay between the two MSK data tones, as applied to the receiver demodulator in an MSK system in a portion of the received MSK message preamble where the content is known. This measure of differential time delay between the two data tones is then used to predict the distortion (or phase shifting effects) on the transmitted MSK waveforms. By comparing the received data to one and zero waveforms, including the predicted phase shifts, the orthogonality of the one and zero states is best preserved and an improved detection decision can be made.

The present invention is further featured in an MSK demodulator system in which differential phase shift of the two modulating tones received is measured and utilized to establish predistorted waveforms to which the incoming data is compared, where the predistorted waveforms are automatically tailored to the particular receiver and transmitter in the communication loop. Any phase distortion peculiar to the transmitter in the communication link and any phase distortion peculiar to the particular receiver being employed is automatically measured and compensated for, to permit more accurate identification of successive symbols in the incoming data in spite of the particular phase distortions introduced.

These and other features and objects of the present invention will become apparent upon reading the following description with reference to the accompanying drawings in which.

Figure 2:
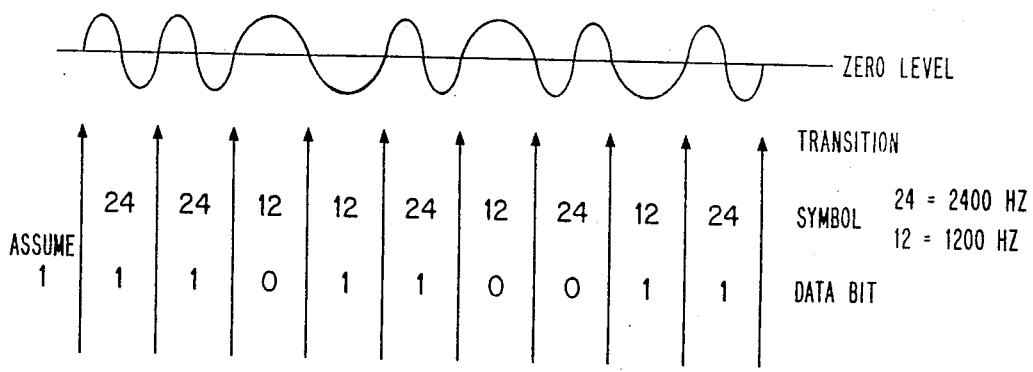
FIG. 2 illustrates a typical MSK modulating signal showing how the data is created or encoded at the transmitter.

With reference to FIG. 2, a portion of a typical demodulated intelligence defining signal is illustrated, showing how the data is created (or encoded) at the point of origin. With reference to FIG. 2, nine sequential symbol intervals are depicted. The first interval is defined by one full cycle of 2400 Hz, the second interval by a further full cycle of 2400 Hz, the third interval by one-half cycle of 1200 Hz, the fourth interval by a further one-half cycle of 1200 Hz, the fifth interval by a full cycle at 2400 Hz, the sixth interval by one-half cycle at 1200 Hz, the seventh interval by a full cycle of 2400 Hz, the eighth interval by one-half cycle of 1200 Hz, and the finally depicted cycle by a full cycle of 2400 Hz. Assuming, for example, that the symbol interval immediately preceding the first depicted interval represented a binary 1, the depicted intervals of FIG. 2 sequentially represent 110110011. Thus, it is illustrated that one cycle of 2400 Hz indicates that the current data bit is the same as the previous data bit, while one-half cycle of 1200 Hz indicates the current bit is the opposite of the previous data bit.

The idealized MSK data transmission thus comprises concatenated permutations of successive symbol-defining transmission intervals, each defined by either a full cycle of 2400 Hz or one-half cycle of 1200 Hz. The idealized waveform of FIG. 2 depicts the transitions from one symbol to the next succeeding symbols all occurring at the zero crossings of the respective waveforms. As suggested above, this idealized waveform is in fact rarely, if ever, that inputted to the detector in the MSK receiver. More typically, differential phase distortlon is present in the transmission system with contributions from both the transmitter and the receiver, such that the composite waveform inputted to the receiver detector does not consistently have zero crossings which occur at the transition points between successive symbol intervals.

Figure 3:
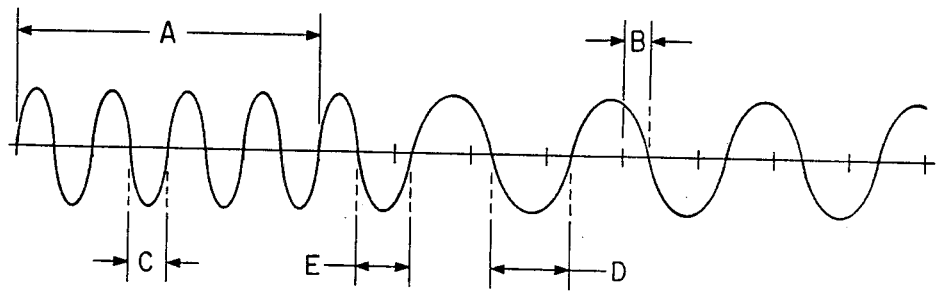
FIG. 3 is an example of a detected MSK transmission sequence in which differential phase distortion between the two tones employed is being experienced.

Reference is made to FIG. 3, which shows an actual waveform obtained from monitoring off-the-air data. The waveform depicted in FIG. 3 was monitored with a VHF 700 receiver and the waveform captured with a Nicolet Digital Storage Scope and then plotted. During time interval A, four successive cycles of 2400 Hz have zero crossings aligned with major divisions of the graph upon which the waveform is plotted. In the case of symbols depicted by half-cycles of 1200 Hz, the zero crossings are not aligned with major divisions of the graph, but are time delayed by interval B from such major divisions. Also depicted in FIG. 3 are a half-cycle of 2400 Hz at C, and a half-cycle of 1200 Hz at D. Because of the difference in delay in the demodulated 1200 and 2400 Hz signals, confusion is seen to occur during interval E. It is questionable whether interval E depicts 2400 Hz or a half-cycle of 1200 Hz. It is this type of distortion that the differential phase delay produces.

In known MSK detection systems, the time between zero crossings is utilized to determine (or decide) whether the symbol is 2400 Hz or the 1200 Hz symbol. Close observation of the waveform depicted in FIG. 3 indicates that the waveform is changing from one frequency to the other at a point removed from the zero crossing. Therefore, any attempt to make a detection decision on a wavefrom between zero crossings will yield poor results, since an adjacent symbol will be overlapping into the detection window.

The solution to the above-defined problem, as provided by the present invention, is to align the detection window over the incoming symbol, and to know what that incoming symbol should be for the particular differential phase delay occurring in the system. According to the present invention, a detection window is alignable over a symbol and the form of the symbol with which the detection window is aligned is distinctly identifiable for the particular differential phase delay occurring in the system.

In the system described herein, the receive signal contains a fixed pre-key message content followed by a bit sync message content. These preamble message contents are comprised of 128 cycles of 2400 Hz followed by 13 half-cycles of 1200 Hz. This fixed content allows the system to establish a phase reference (or lock) to the 2400 Hz tone. The phase difference (lead or lag) of the 1200 Hz portion of the message is then sampled, averaged and stored.

The point at which the 2400 Hz symbol changes to a 1200 Hz symbol (and the reverse) can be found by noting that no discontinuities are produced by this distortion. Therefore, the 2400 Hz symbol and the 1200 Hz symbol amplitudes must be nearly equal at the point of symbol change.

Assuming a system "locked" or referenced to the 2400 Hz phase, the two symbol amplitudes may be defined as follows:

$$A_{2400}(t) = \sin(2\pi 2400)t \tag{1}$$

$$A_{1200}(t) = \sin(2\pi 1200)(t-t_d), \tag{2}$$

where $t_d$ = differential phase delay of 1200 Hz with respect to 2400 Hz.

Setting expressions (1) and (2) equal and solving for t:

$$\sin(2\pi 2400)t = \sin(2\pi 1200)(t-t_d) \tag{3}$$

For $|t_d| < (8\pi 2400)$ 1;

$$(2\pi 2400)t = (2\pi 1200)(t-t_d) \tag{4}$$

$$2t = t - t_d \tag{5}$$

$$t = -t_d \tag{6}$$

Expression (6) states (in the case of the typical received signal depicted in FIG. 3) that if the zero crossings of the 1200 Hz occur 120 microseconds later than the 2400 Hz signal would have occurred, then the point at which one symbol changes to the next succeeding symbol will be 120 microseconds prior to the normal 2400 Hz zero crossing.

Figure 4:
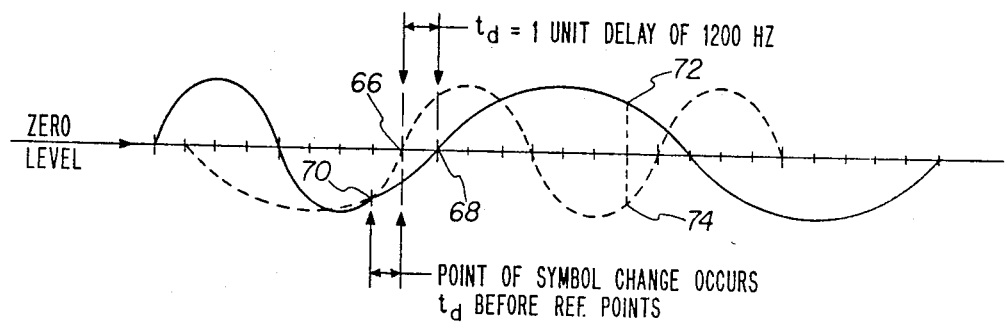
FIG. 4 is a diagrammatic representation illustrating an exampled differential phase distortion between the two modulating tones.
Figure 5:
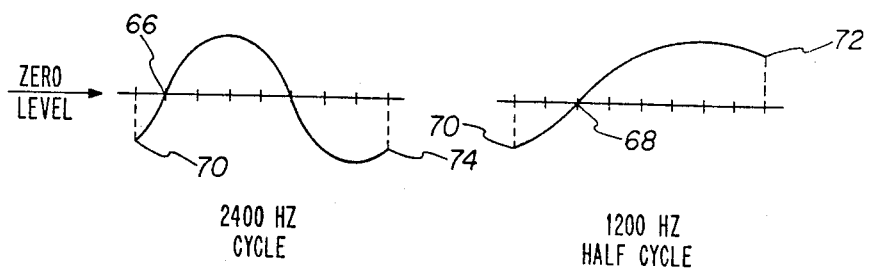
FIG. 5 illustrates in accordance with the present invention, the particular reference symbols utilized to correlate with the exampled incoming data of FIG. 4 to compensate for differential phase delay between the two tones.

The above is illustrated in FIG. 4, where the solid line depicts received data. It is noted that the zero crossing 68 of a 1200 Hz symbol occurs one unit delayed with respect to the zero crossing 66 of the preceding 2400 Hz tone. The point of symbol change 70 occurs $t_d$ before the reference point 66. Now that we can predict where the symbols change, we also know what the symbols look like when differential phase delay is encountered. In the case depicted in FIG. 4, the symbols are illustrated in FIG. 5. The 2400 Hz full cycle does not begin and end at zero reference level, but rather begins one unit prior to the zero reference level 66 at point 70 and ends at point 74. FIG. 5 depicts the 1200 Hz half-cycle defined symbol as likewise not beginning at a zero crossover point and terminating at a next succeeding zero crossover point; rather, the 1200 Hz half-cycle symbol interval begins at point 70, which precedes a 1200 Hz zero point crossing by two units, and terminates at point 72 which precedes the next succeeding zero crossing of the 1200 Hz half-cycle interval by two units. Although the symbols do not begin and end on a zero crossing they are still orthogonal signals, that is, they cross-correlate to equal zero. This permits correlation of the received data against these distorted symbols for making the best decision as to which symbol was present in the originating waveform.

Figure 1:
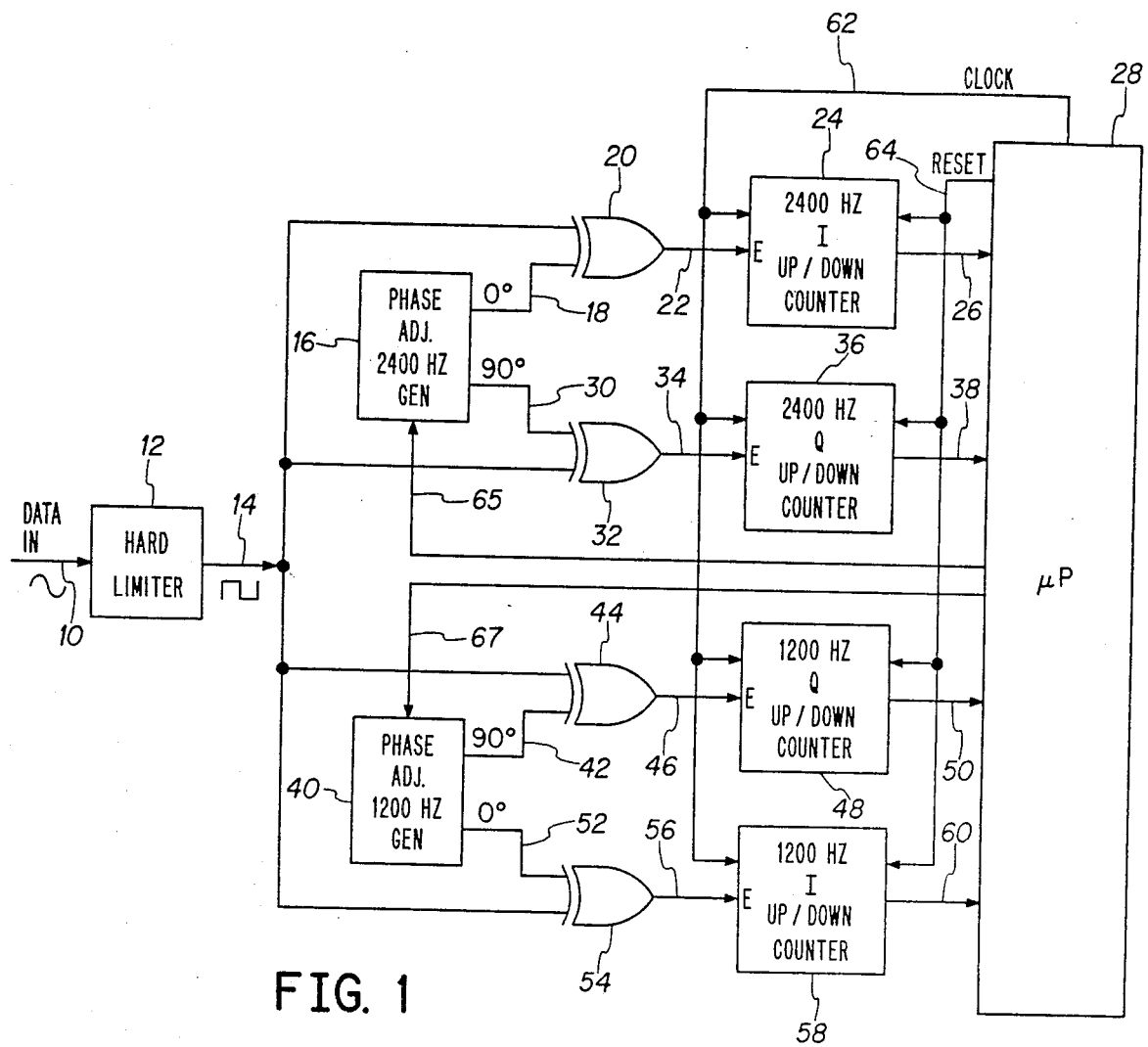
FIG. 1 is a functional block diagram of an improved detector of minimum shift keying of data transmission signals in accordance with the present invention.

The detection system in accordance with the present invention is functionally illustrated in the block diagram of FIG. 1. Input data 10 is applied to a hard limiter 12 to develop a squared output 14 where zero crossings of the waveform are positively defined. A 2400 Hz phase adjustable generator 16 provides a zero degree (I) output 18 which is applied as first input to exclusive-OR gate 20. The output 14 from limiter 12 is applied as the second input to exclusive-OR gate 20. The output 22 from exclusive-OR gate 20 is applied as an up/down controlling input to a 2400 Hz (I) up/down counter 24. The output 26 from counter 24 is inputted to a microprocessor 28.

Phase adjustable 2400 Hz generator 16 provides a second Q output 30 which is in phase quadrature with I output 18 and is applied as a first input to a further exclusive-OR gate 32. The output 14 from hard limiter 12 is applied as a second input to exclusive-OR gate 32. The output 34 from exclusive-OR gate 32 is applied as an up/down controlling input to a 2400 Hz (Q) up/down counter 36. Output 38 from counter 36 is applied to microprocessor 28.

The system includes a second phase adjustable 1200 Hz generator 40. Generator 40 provides phase quadrature outputs with a 90° (Q) output 42 being applied to exclusive-OR gate 44 along with the output 14 from hard limiter 12. The output 46 from exclusive-OR gate 44 is applied as an up/down controlling input to a 1200 Hz (Q) up/down counter 48. Output 50 from counter 48 is applied to microprocessor 28.

The zero degree (I) output 52 from phase adjustable 1200 Hz generator 40 is applied as a first input to an exclusive-OR gate 54. A second input to exclusive-OR gate 54 comprises the output 14 from hard limiter 12.

The output 56 from exclusive-OR gate 54 is applied as an up/down input control to a 1200 Hz (I) up/down counter 58. Output 60 from counter 58 is applied to microprocessor 28. A clock input 62 from microprocessor 28 is applied as clock input to each of the up/down counters 24, 26, 48 and 58. Reset control 64 from microprocessor 28 is applied as a zero resetting input to each of counters 24, 26, 48 and 58. Microprocessor 58 provides respective phase adjusting outputs 65 and 67 to phase adjustable reference generators 16 and 40.

In general operation, the two phase adjustable generators 16 and 40 of FIG. 1 are utilized to produce the two tones present in the anticipated MSK data inputted at 10. Each of the generators 16 ad 40 has a "0°" degree (I) output and a 90° (Q) output. Each of these I and Q outputs are utilized by an exclusive-OR gate and counter combination to measure the degree of correlation of the incoming data to each of the reference signals 18,, 30, 42 and 52. The correlation information is fed from binary counters to microprocessor 28 which performs the following three-step procedure.

Step 1: The system awaits the message preamble of 2400 Hz by constantly evaluating $|I_{2400}| + |Q_{2400}|$. Once this summation exceeds a predetermined threshold, the reference generators are adjusted to maximize $|I_{2400}|$ and hold $Q_{2400}$ equal to zero. This establishes phase lock to the incoming 2400 Hz tone.

Step 2: The system now looks for a burst of 1200 Hz which is also contained in the message preamble. This is done by comparing $|I_{1200}| + |Q_{1200}|$ to $|I_{2400}|$. When the burst of 1200 Hz is detected, the $I_{1200}$ and the $Q_{1200}$ values (stored in counters 58 and 48, respectively) are sampled and averaged for the duration of the 1200 Hz burst. The relative magnitude and polarity of $I_{1200}$ compared to $Q_{1200}$ is a measure of phase shift of the 1200 Hz compared to the 2400 Hz in the inputted signal 10.

Step 3: The 1200 Hz generator is now advanced (or retarded) in phase to duplicate the measured phase shift. Also, the time when the counters are sampled and reset is phase shifted with respect to both the 2400 Hz and 1200 Hz generators to align the correlation interval and the incoming data. This sampling shift is also calculated on the basis of the measured differential phase shift and the knowledge that the 2400 Hz to 1200 Hz transition (or reverse) will occur without discontinuity. Once these adjustments have been made, the system will base its detection decision on the larger of $I_{2400}$ and $I_{1200}$. Once the decision is made, the appropriate Q channel is monitored and a small correcting phase shift is applied to the system to maintain overall phase lock with the incoming data until the data transmission ends.

The system depicted functionally at FIG. 1 is thus seen to comprise four correlators, each comprising an exclusive-OR gate to which incoming data and reference symbol are applied as respective inputs, with the output of the exclusive-OR gate controlling the up-down count in a binary counter, The count developed in the counter is a measure of the correlation between the input and reference symbols. The clock source applied to each of the up-down counters runs at 128 times the bit or symbol rate existing in the system. At the beginning of a correlation cycle (adjusted to symbol window), the counters are cleared. As the cycle proceeds, if the incoming limited data on line 14 is the same level as that of the reference symbol, the counter increments. If the incoming data is the opposite level of the reference, the counter decrements. Therefore, if the incoming symbol is the same as the reference, the counter will reach a high positive value (+127). If the incoming symbol is the same symbol but inverted, the counter will reach a large negative value (−127). If the incoming symbol is orthogonal to the reference, the counter will stay near zero.

The detection mechanism is thus defined as follows. After each correlation window, the 2400 I counter output is compare to the 1200 I counter output. The symbol decision is based on which counter has the largest magnitude value.

Two additional correlation channels are provided which utilize the Q (90°) outputs from the 2400 Hz reference generator 16 and the 1200 Hz reference generator 40. These Q correlation channels are driven by the I channel references delayed by 90°. When a symbol is decided to be 2400 Hz or 1200 Hz, its respective Q channel is examined. If the incoming data was in phase (or +180°), with the I channel reference, the Q counter will be approximately zero. If a positive or negative value is accumulated in the counter, this represents a phase error, and the processor shifts the correlation window on all channels a slight amount to reduce this error. This then keeps the demodulator phase locked to the incoming data.

In addition, the 1200 Hz I and Q channels can be used to make a fast phase measurement of the thirteen half-cycles of 1200 Hz in the message preamble. Initially, the system will use the 2400 Hz I and Q references to lock on to the 2400 Hz pre-key burst. When the 2400 Hz is replaced by 1200 Hz in the incoming data, the 1200 Hz reference generators are initialized in phase (zero crossings) with the 2400 Hz generators. The contents of the I and Q 1200 Hz counters indicate the 1200 Hz phase relationship by the following:

$$t_d = \tfrac{1}{2} \times 1/1200 \times /(|I_{1200}| + |Q_{1200}|/Q_{1200}$$

This eliminates the need to "lock on" to the 1200 Hz, thus allowing a phase measurement on all thirteen half-cycles of 1200 Hz and averaging the result.

The present invention is thus seen to provide a detection system for an MSK receive signal which automatically compensates for differential phase shift between the respective tones employed in symbol definition in the incoming data. A measurement of the differential phase shift between the two received tones embodied in the incoming data is utilized to provide distorted reference tone generator signals for comparison with the incoming data so as to compensate for differential phase distortion experienced, and thus provide a more exacting detection decision.

Although the present invention has been described with respect to a particular embodiment thereof, it is not to be so limited, as changes might be made in the invention without departing from the scope thereof as defined in the appended claims.

I claim:

1. In a minimum shift keying data detection system employing a pair of intelligence-defining symbols comprised of concatenate-like intervals of one or the other of first and second tones $f_1$ and $f_2$, said tones each having a respective phase, where $f_1$ equals $f_2/2$ and where said interval comprises one-half cycle period of $f_1$, an improved detection system for identifying respective ones of concatenate symbols applied thereto comprising:

means for measuring the differential relationship of said phase of said first tone with respect to said phase of said second tone including:

first and second phase adjustable tone generators, each of said first and second tone generators generating first and second reference generator quadraturized outputs;

the quadraturized outputs from said first tone generators applied respective first inputs to respective first and second exclusive-OR gates;

the quadraturized outputs from said second tone generators being applied as respective first inputs to respective third and fourth exclusive-OR gates;

said concatenate symbols being applied as respective second inputs to each of said first, second, third and fourth exclusive-OR gates;

first, second, third and fourth up-down binary counters receiving the respective outputs from said first, second, third and fourth exclusive-OR gates;

means for providing a clock input to each of said counters, said clock input having a repetition rate in excess of the time duration of said inputted symbols;

means for phase locking the output of said first reference signal generator to the applied $f_2$ tone;

means for sampling the respective quadraturized outputs of each of said $f_1$ counters at said clock and averaging said samples for the duration of said $f_1$ time input symbols;

means for comparing the absolute value of the averaged sampled output from said $f_1$ counter to obtain a measure of the phase relationship of tone $f_1$ with respect to tone $f_2$; and means for resetting each of said binary counters to zero at the conclusion of each concatenate input symbol-defining interval;

means to establish predistorted first and second cross-correlated tone reference waveforms in accordance with said differential phase relationship; and means for correlating the concatenate tone-defined symbols applied to said detection system against respective ones of said predistorted tone reference waveforms to identify successively applied ones of said intelligence-defining symbols.

2. The detection system as defined in claim 1 wherein said means to establish such predistorted waveforms comprises, means for adjusting the phase of said $f_1$ reference tone generator to duplicate said measured relative relationship between $f_1$ and $f_2$, means for phase shifting the sample and reset times of said counters with respective to each of said $f_2$ and $f_1$ reference generators to align the correlation time interval and the concatenate input symbols.

3. The detection system as defined in claim 2 wherein said means for comparing comprises means for comparing the amplitudes of the absolute value of the respective in-phase (I) outputs of each of said first and third binary counters to which the outputs of said first and third exclusive-OR gate are inputted, and means for generating a detection decision based on the larger of these respective counter outputs.

4. The detection system as defined in claim 3 further comprising means to monitor the amplitude and polarity of the quadrature (90°) outputs from each of said second and fourth counters to provide signals definitive of phase lock discrepancy between incoming data and said reference signal generators, and means to apply corrective phase shift to such first and second reference signals generation in accordance therewith.

* * * * *